United States Patent
Cao

(10) Patent No.: US 11,300,694 B2
(45) Date of Patent: Apr. 12, 2022

(54) RADIATION DETECTOR WITH A DC-TO-DC CONVERTER BASED ON MEMS SWITCHES

(71) Applicant: SHENZHEN XPECTVISION TECHNOLOGY CO., LTD., Shenzhen (CN)

(72) Inventor: Peiyan Cao, Shenzhen (CN)

(73) Assignee: SHENZHEN XPECTVISION TECHNOLOGY CO., LTD., Shenzhen (CN)

(*) Notice: Subject to any disclaimer, the term of this patent is extended or adjusted under 35 U.S.C. 154(b) by 107 days.

(21) Appl. No.: 16/854,053

(22) Filed: Apr. 21, 2020

(65) Prior Publication Data

US 2020/0249365 A1    Aug. 6, 2020

Related U.S. Application Data

(63) Continuation of application No. PCT/CN2017/108242, filed on Oct. 30, 2017.

(51) Int. Cl.
*G01T 1/24* (2006.01)

(52) U.S. Cl.
CPC ................... *G01T 1/247* (2013.01)

(58) Field of Classification Search
CPC ......... G01T 1/247; G01T 1/2928; G01T 1/24; G01T 1/241; H01H 59/0009; H02M 3/07
See application file for complete search history.

(56) References Cited

U.S. PATENT DOCUMENTS

| | | | | |
|---|---|---|---|---|
| 2003/0090346 A1* | 5/2003 | Nikitin | ..................... | H01G 5/16 333/262 |
| 2006/0138336 A1* | 6/2006 | Seino | ..................... | G01T 1/249 250/370.13 |
| 2011/0198202 A1* | 8/2011 | Rogers | ................... | B81B 3/0056 200/181 |
| 2011/0204248 A1* | 8/2011 | Seino | ....................... | G01T 1/17 250/371 |
| 2011/0241766 A1 | 10/2011 | Zhang et al. | | |
| 2012/0076274 A1 | 3/2012 | Shimizukawa | | |
| 2015/0268356 A1* | 9/2015 | Kominami | ............. | A61B 6/037 250/370.08 |
| 2016/0187491 A1* | 6/2016 | Scott | ........................ | G01T 7/005 250/370.07 |

(Continued)

FOREIGN PATENT DOCUMENTS

CN    1505248 A    6/2004
CN    101218654 A    7/2008

(Continued)

OTHER PUBLICATIONS

PCT/CN2017/108242 ISA210 Mail Date Aug. 1, 2018.
PCT/CN2017/108242 ISA237 Mail Date Aug. 1, 2018.

*Primary Examiner* — Christine S. Kim
(74) *Attorney, Agent, or Firm* — IPRO, PLLC; Qian Gu

(57) ABSTRACT

An apparatus suitable for detecting radiation, comprising: a radiation absorption layer comprising a semiconductor, a first electrical contact and a second electrical contact, the first electrical contact positioned across the semiconductor from the second electrical contact; a DC-to-DC converter configured to apply a DC voltage between the first electrical contact and the second electrical contact, the DC-to-DC converter comprising micro-electromechanical switches.

21 Claims, 18 Drawing Sheets

(56) References Cited

U.S. PATENT DOCUMENTS

2016/0206257 A1\* 7/2016 Kominami ............ H01L 31/032
2016/0313458 A1\* 10/2016 Masuda ............ H01L 27/14612
2017/0123084 A1\* 5/2017 Ferenc .................. G01T 1/2018

FOREIGN PATENT DOCUMENTS

| CN | 104838289 A | 8/2015 |
| CN | 106104302 A | 11/2016 |
| WO | 2016161542 A1 | 10/2016 |

\* cited by examiner

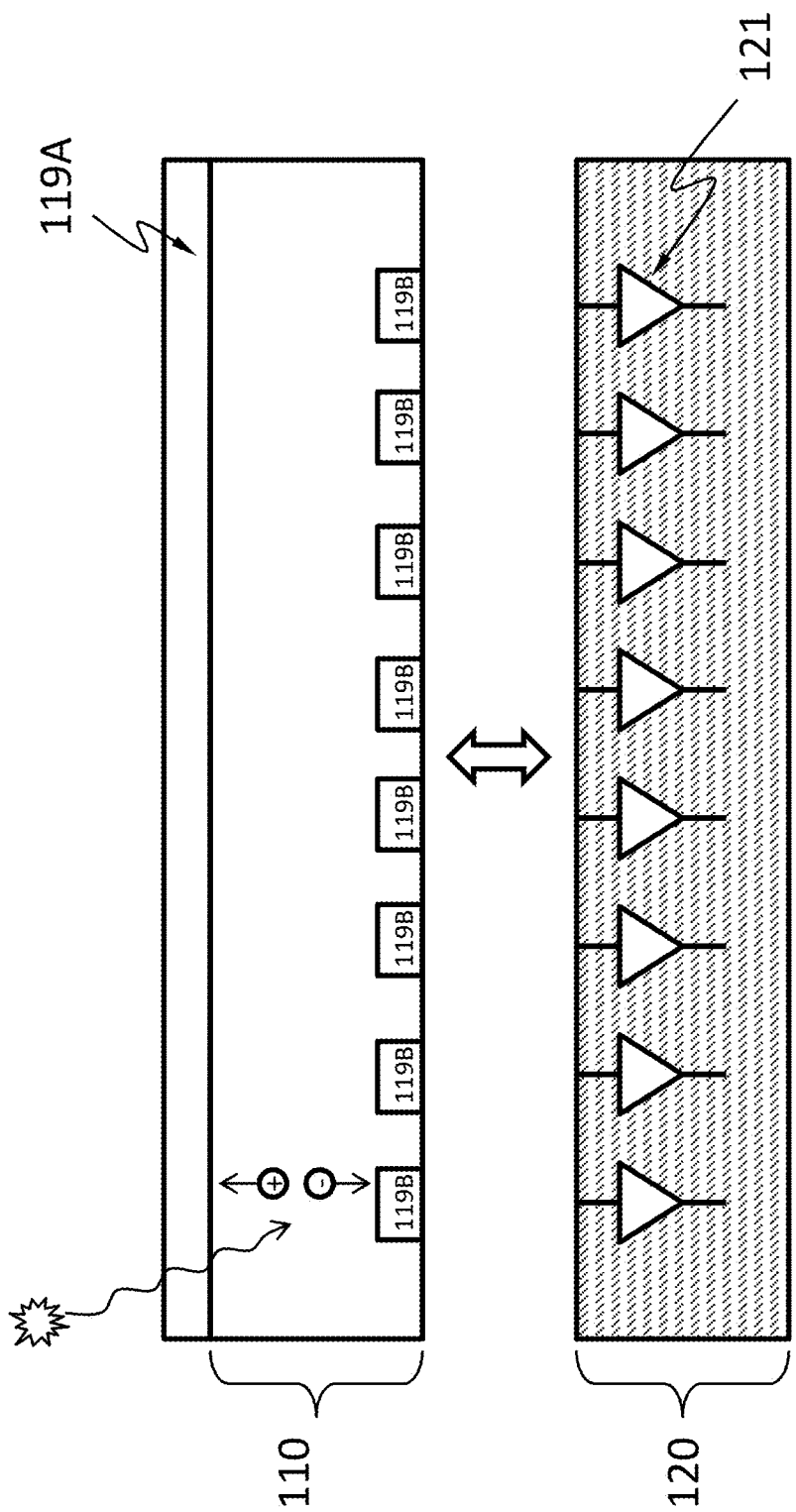

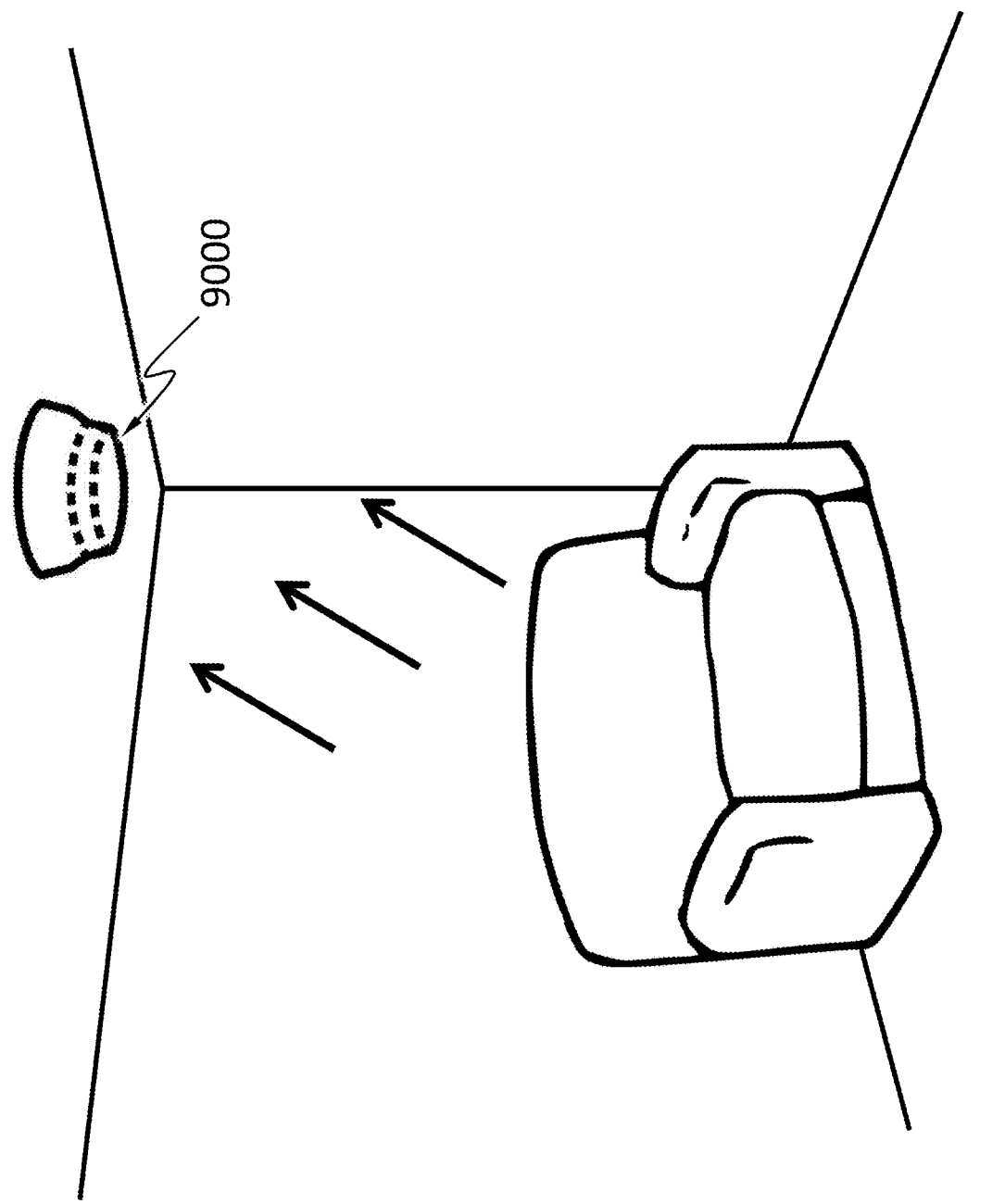

RADIATION DETECTOR WITH A DC-TO-DC CONVERTER BASED ON MEMS SWITCHES

TECHNICAL FIELD

The disclosure herein relates to a radiation detector, particularly relates to a radiation detector using a DC-to-DC converter based on MEMS switches for the electrical bias.

BACKGROUND

A radiation detector is a device that measures a property of a radiation. Examples of the property may include a spatial distribution of the intensity, phase, and polarization of the radiation. The radiation may be one that has interacted with a subject. For example, the radiation measured by the radiation detector may be a radiation that has penetrated or reflected from the subject. The radiation may be an electromagnetic radiation such as infrared light, visible light, ultraviolet light, X-ray or γ-ray. The radiation may be of other types such as α-rays and β-rays.

One type of radiation detectors is based on interaction between the radiation and a semiconductor. For example, a radiation detector of this type may have a semiconductor layer that absorbs the radiation and generate charge carriers (e.g., electrons and holes) and circuitry for detecting the charge carriers.

SUMMARY

Disclosed herein is an apparatus suitable for detecting radiation, comprising: a radiation absorption layer comprising a semiconductor, a first electrical contact and a second electrical contact, the first electrical contact positioned across the semiconductor from the second electrical contact; a DC-to-DC converter configured to apply a DC voltage between the first electrical contact and the second electrical contact, the DC-to-DC converter comprising micro-electromechanical switches.

According to an embodiment, the DC-to-DC converter comprises multiple stages, wherein each of the stages comprises a capacitor and at least one of the micro-electromechanical switches.

According to an embodiment, the DC-to-DC converter if configured to receive a clock signal and to control the micro-electromechanical switches with the clock signal and an inversion thereof.

According to an embodiment, each of the micro-electromechanical switches comprises a cantilever beam, electrical contacts and a control electrode.

According to an embodiment, the micro-electromechanical switches are configured to open or close by changing a voltage on the control electrode.

According to an embodiment, the micro-electromechanical switches comprise silicon, $SiO_2$, $Si_3N_4$, polysilicon, or a combination thereof.

According to an embodiment, the first electrical contact and the second electrical contact are configured to collect charge carriers generated by radiation particles absorbed by the radiation absorption layer.

According to an embodiment, the apparatus further comprises a first voltage comparator configured to compare a voltage of the second electrical contact to a first threshold; a second voltage comparator configured to compare the voltage to a second threshold; a counter configured to register a number of radiation particles absorbed by the radiation absorption layer; a controller, wherein the controller is configured to start a time delay from a time at which the first voltage comparator determines that an absolute value of the voltage equals or exceeds an absolute value of the first threshold; wherein the controller is configured to activate the second voltage comparator during the time delay; wherein the controller is configured to cause the number registered by the counter to increase by one, if the second voltage comparator determines that an absolute value of the voltage equals or exceeds an absolute value of the second threshold.

According to an embodiment, the apparatus further comprises a capacitor module electrically connected to the second electrical contact, wherein the capacitor module is configured to collect charge carriers from the second electrical contact.

According to an embodiment, the controller is configured to activate the second voltage comparator at a beginning or expiration of the time delay.

According to an embodiment, the apparatus further comprises a voltmeter, wherein the controller is configured to cause the voltmeter to measure the voltage upon expiration of the time delay.

According to an embodiment, the controller is configured to determine a radiation photon energy based on a value of the voltage measured upon expiration of the time delay.

According to an embodiment, the controller is configured to connect the second electrical contact to an electrical ground.

According to an embodiment, a rate of change of the voltage is substantially zero at expiration of the time delay.

According to an embodiment, a rate of change of the voltage is substantially non-zero at expiration of the time delay.

According to an embodiment, the radiation absorption layer comprises a diode.

According to an embodiment, the radiation absorption layer comprises silicon, germanium, GaAs, CdTe, CdZnTe, or a combination thereof.

According to an embodiment, the apparatus does not comprise a scintillator.

According to an embodiment, the apparatus comprises a GPS receiver configured to record a location of radiation detected by the apparatus.

According to an embodiment, the apparatus comprises a display configured to show information of radiation detected by the apparatus.

According to an embodiment, the apparatus comprises a wireless transmitter configured to transmit information of radiation detected by the apparatus to a receiving device.

According to an embodiment, a system comprising the apparatus mentioned herein is selected from a group consisting of a radiation detection ID card, a radiation detection badge, a radiation detection pen, a piece of radiation prevention apparel, a radiation detection wristband, a radiation detection watch, a radiation detection headphone, a radiation detection cell phone accessory, and a food radiation detection apparatus, and a household radiation detector.

BRIEF DESCRIPTION OF FIGURES

FIG. 2C schematically shows an alternative detailed cross-sectional view of the radiation detector.

FIG. 14 schematically shows a household smoke detector comprising a radiation detection system described herein, according to an embodiment.

DETAILED DESCRIPTION

Figure 1:
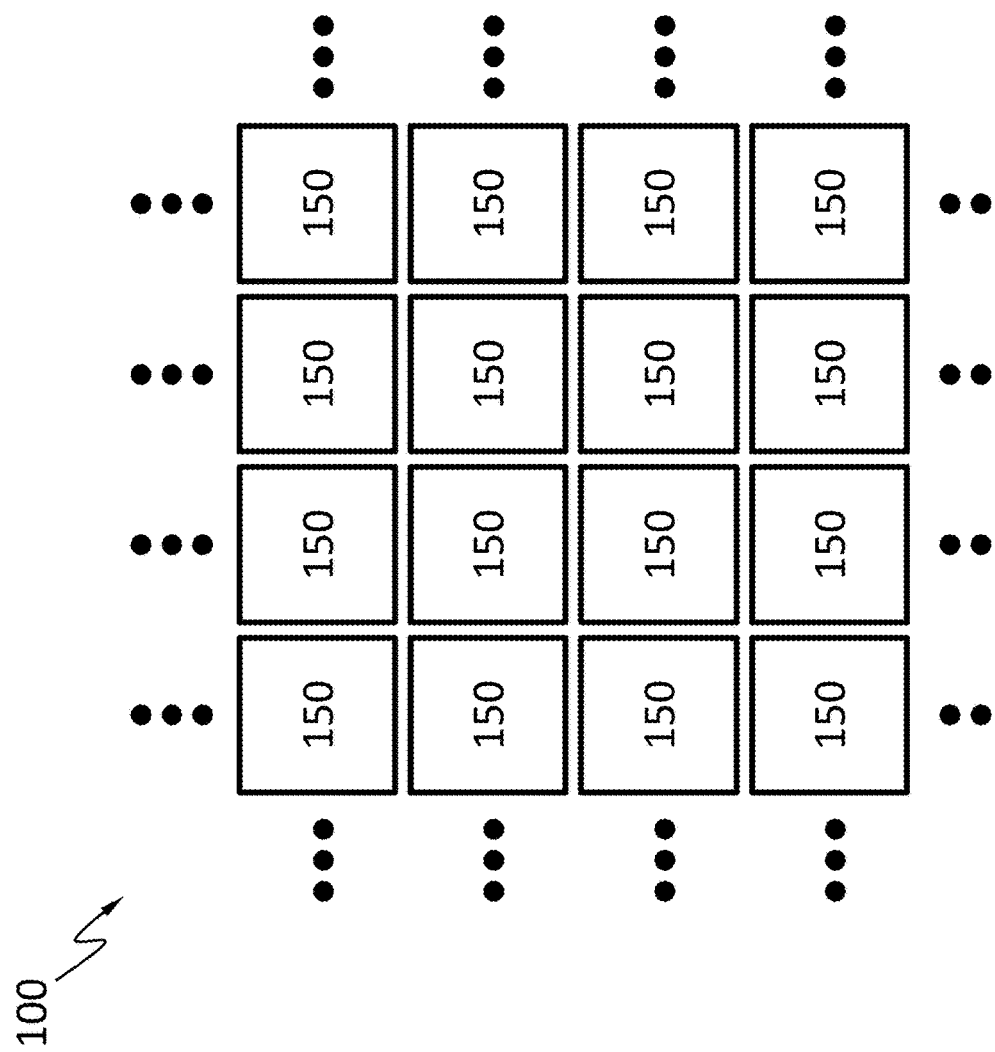
FIG. 1 schematically shows a radiation detector, according to an embodiment.

FIG. 1 schematically shows a radiation detector 100, as an example. The radiation detector 100 may have an array of pixels 150. The array may be a rectangular array, a honeycomb array, a hexagonal array or any other suitable array. Each pixel 150 is configured to detect radiation from a radiation source incident thereon and may be configured measure a characteristic (e.g., the energy of the particles, the wavelength, and the frequency) of the radiation. For example, each pixel 150 is configured to count numbers of photons incident thereon whose energy falls in a plurality of bins, within a period of time. All the pixels 150 may be configured to count the numbers of photons incident thereon within a plurality of bins of energy within the same period of time. When the incident photons have similar energy, the pixels 150 may be simply configured to count numbers of photons incident thereon within a period of time, without measuring the energy of the individual photons. Each pixel 150 may have its own analog-to-digital converter (ADC) configured to digitize an analog signal representing the energy of an incident photon into a digital signal, or to digitize an analog signal representing the total energy of a plurality of incident photons into a digital signal. The pixels 150 may be configured to operate in parallel. For example, when one pixel 150 measures an incident photon, another pixel 150 may be waiting for a photon to arrive. The pixels 150 may not have to be individually addressable.

Figure 2A:
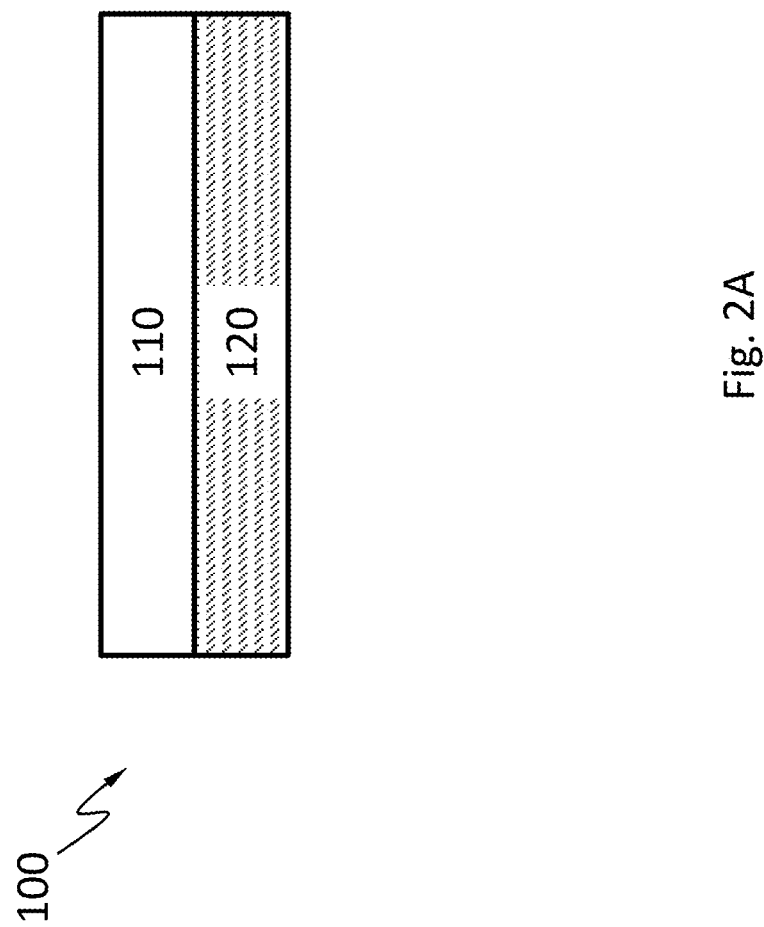
FIG. 2A schematically shows a cross-sectional view of the radiation detector.

FIG. 2A schematically shows a cross-sectional view of the radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. The radiation detector 100 may or may not include a scintillator. The radiation absorption layer 110 may include a semiconductor such as, silicon, germanium, GaAs, CdTe, CdZnTe, or a combination thereof. The semiconductor may have a high mass attenuation coefficient for the radiation of interest.

Figure 2B:
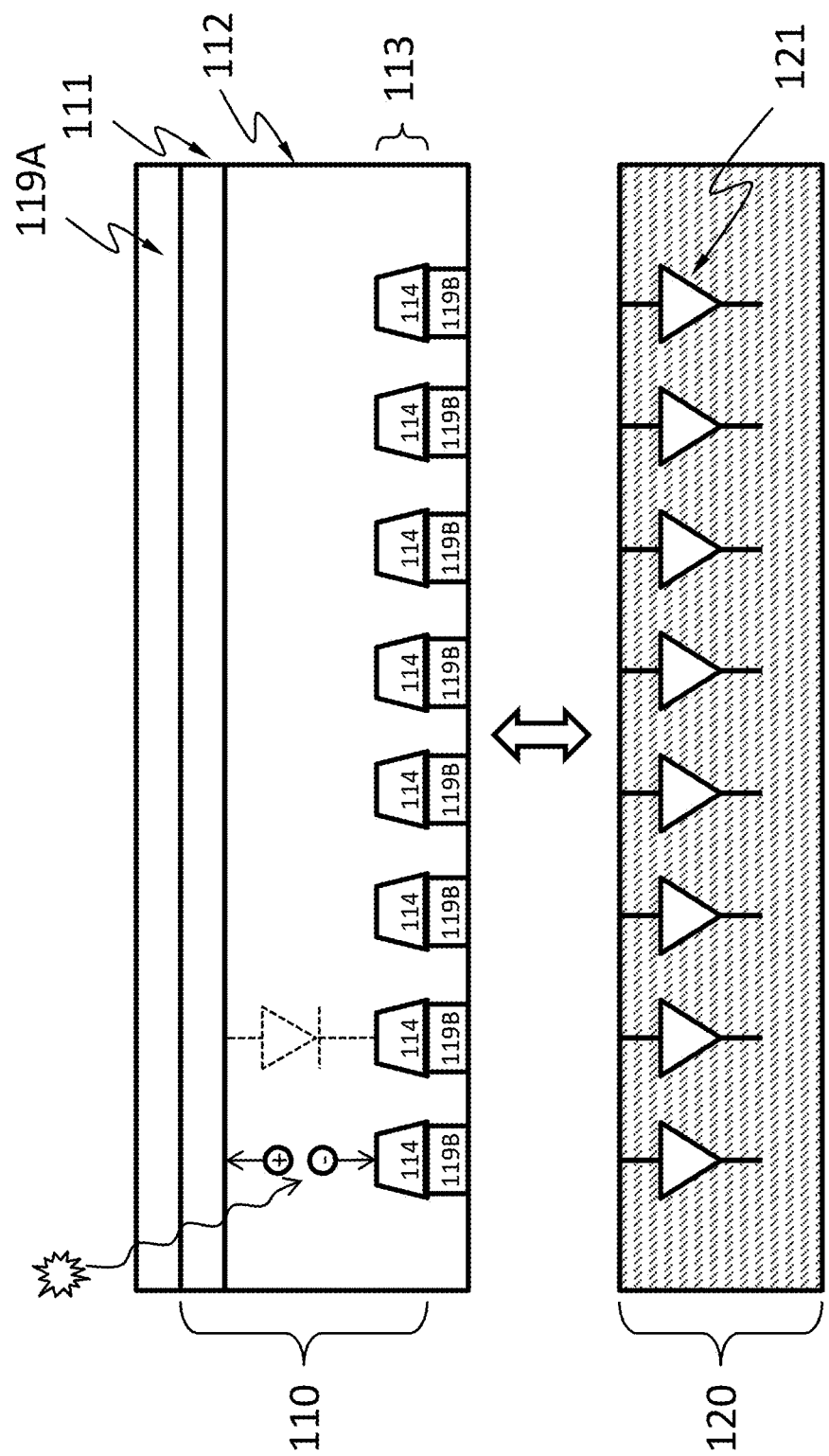
FIG. 2B schematically shows a detailed cross-sectional view of the radiation detector.

As shown in a detailed cross-sectional view of the radiation detector 100 in FIG. 2B, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes having the first doped region 111 as a shared electrode. The first doped region 111 may also have discrete portions.

When radiation from the radiation source hits the radiation absorption layer 110 including diodes, the radiation particle (e.g., photon) may be absorbed and generate one or more charge carriers by a number of mechanisms. The charge carriers may drift to the electrodes of one of the diodes under an electric field. The field may be an external electric field. The field may be an external electric field between electrical contact 119A and electrical contact 119B, where the electrical contact 119A is positioned across the radiation absorption layer 110 from the electrical contact 119B. The external electric field may be established by a DC voltage between the electrical contact 119A and the electrical contact 119B. The DC voltage may be applied by a DC-to-DC converter. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel.

As shown in an alternative detailed cross-sectional view of the radiation detector 100 in FIG. 2C, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation of interest.

When the radiation hits the radiation absorption layer 110 including a resistor but not diodes, it may be absorbed and generate one or more charge carriers by a number of mechanisms. A particle of the radiation may generate 10 to 100000 charge carriers. The charge carriers may drift to the electrical contacts 119A and 119B under an electric field. The field may be an external electric field or an electric field between the electrical contacts 119A and 119B. The electric field may be established by a DC-to-DC converter, for example, by applying a DC voltage between the electrical contact 119A and the electrical contact 119B. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

Figure 3A:
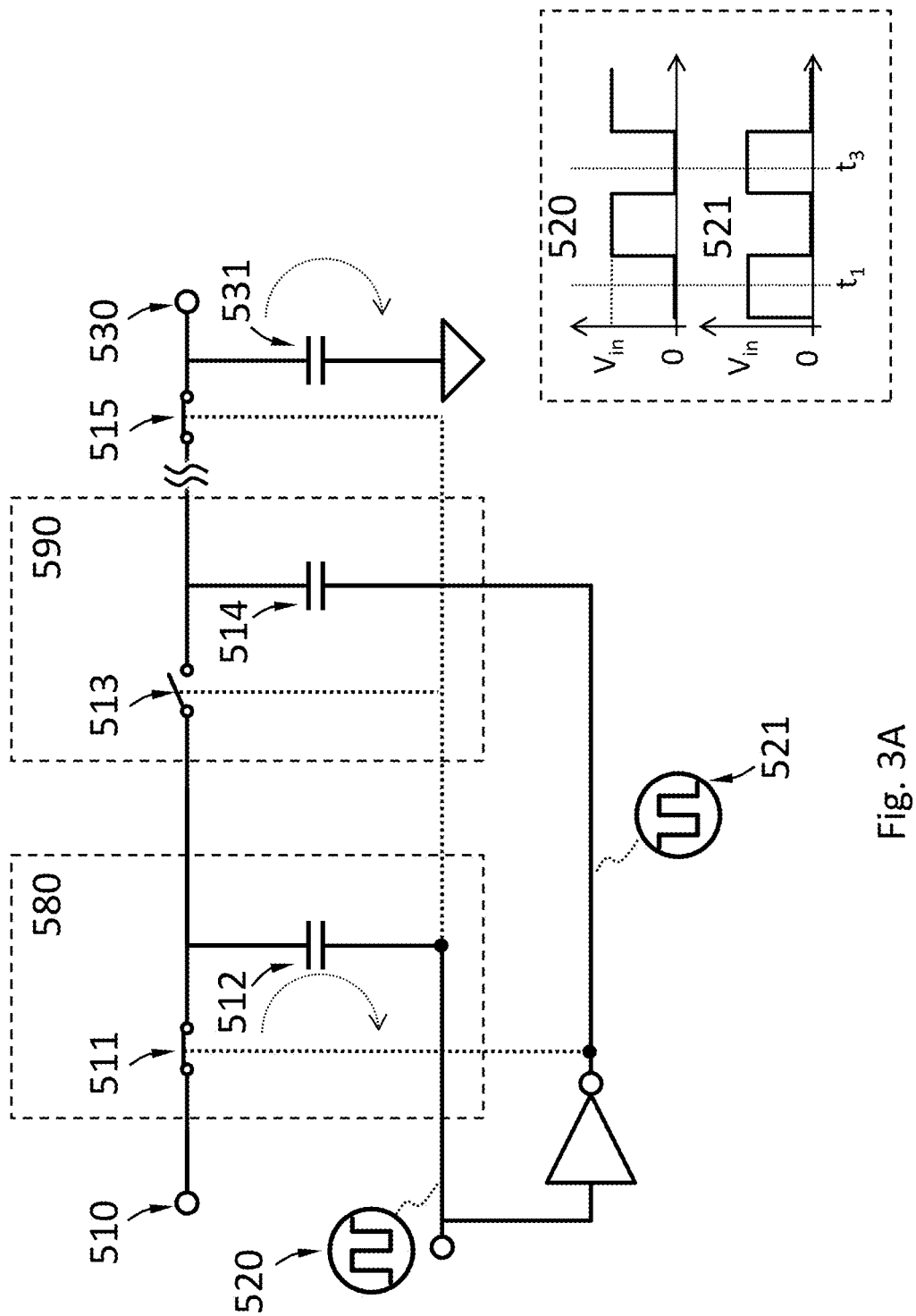
FIG. 3A and FIG. 3B schematically show functional diagrams of a multi-stage DC-to-DC converter, according to an embodiment.
Figure 3B:
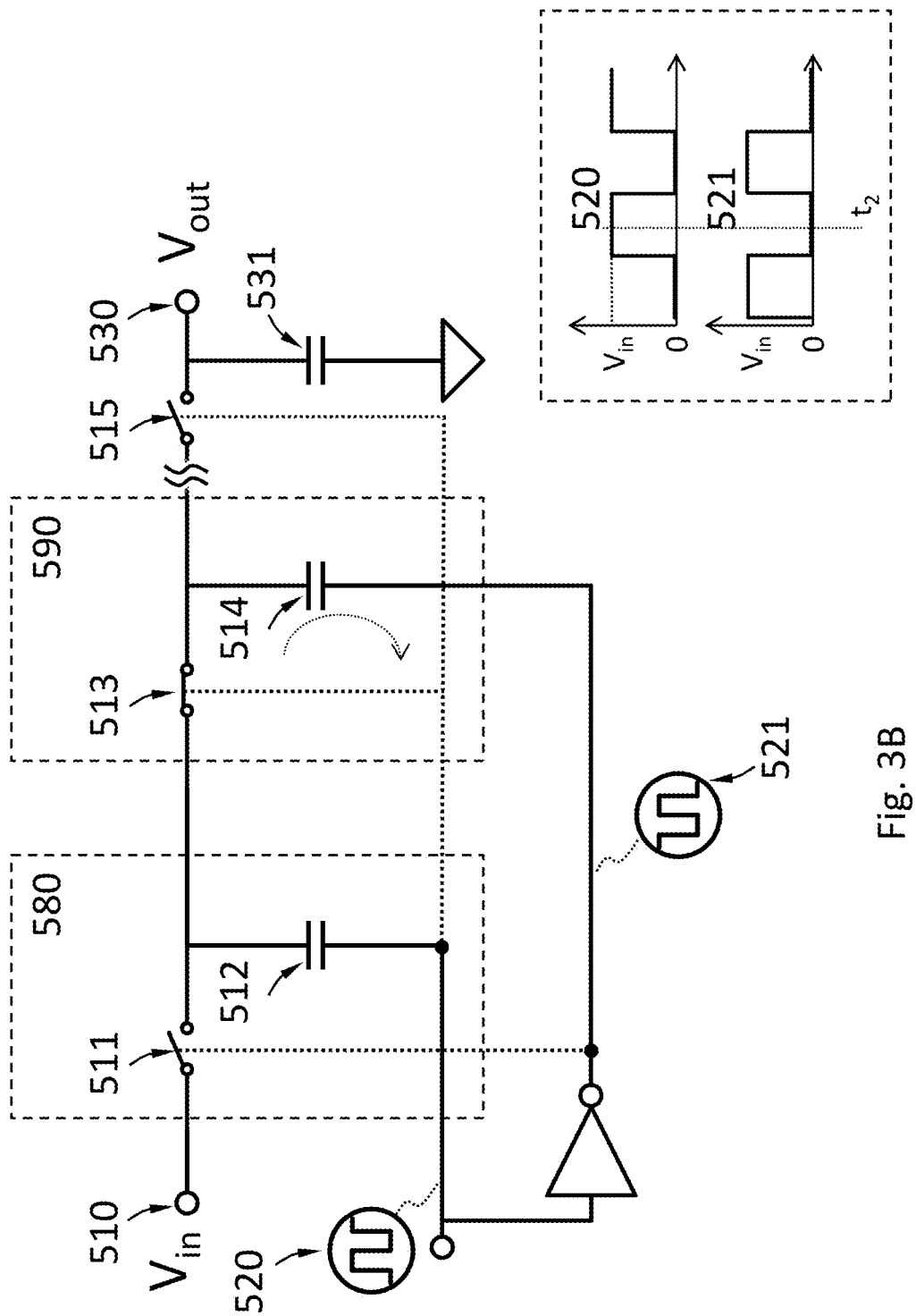

A DC-to-DC converter may be configured to generate the electric field that causes the charge carriers to drift in the radiation absorption layer 110, according to an embodiment. The DC-to-DC converter may output a voltage (e.g., >50V, or >100V) higher than the voltage the DC-to-DC converter receives (e.g., from a battery). FIG. 3A and FIG. 3B show an example circuitry of a DC-to-DC converter, wherein each stage (e.g., stage 580 and stage 590) of the DC-to-DC converter comprises a switch (e.g., switch 511 in stage 580 and switch 513 in stage 590) and a capacitor (e.g., capacitor 512 in stage 580 and capacitor 514 in stage 590). In this example circuitry, the DC-to-DC converter receives an input DC voltage $V_{in}$ from an input 510 and a clock signal 520. The DC-to-DC converter produces an output DC voltage at an output 530. The amplitude of the clock signal 520 may be equal to the input DC voltage $V_{in}$ (e.g., minima of the clock signal 520 being zero, and maxima of the clock signal 520 being at the input DC voltage). The clock signal 520 is applied to the capacitor 512 and an inversion 521 of the clock signal 520 is applied to the capacitor 514. The inversion 521 is at its maxima when the clock signal 520 is at its minima, and the inversion 521 is at its minima when the clock signal 520 is at its maxima. Examples of the waveforms of the clock signal 520 and the inversion 521 are shown in FIG. 3A and FIG. 3B. When the clock signal 520 is at its minima (e.g., at time $t_1$), as shown in FIG. 3A, the switch 511 is closed, the switch 513 is open, and a switch 515 before a load capacitor 531 at an output of the DC-to-DC converter is closed; the capacitor 512 is being charged by the input 510 to $V_{in}$ and the load capacitor 531 is being charged by the capacitor in the previous stage, which is the capacitor 514 in this example (as shown by the dotted arrows). The switches are controlled by circuits driven by the clock signal 520 and the inversion 521, as shown by the dotted lines in FIG. 3A and FIG. 3B. The switches of the stages are controlled alternately by the clock signal 520 and the inversion 521. Namely, the switch 511 of the stage 580 is controlled by the clock signal 520, and the switch 513 of the stage 590 is controlled by the inversion 521. Therefore the switches of 2 adjacent stages are in different states during conversion. When the clock signal 520 is at its maxima (e.g., at time $t_2$), as shown in FIG. 3B, the switch 511 is open, the switch 513 is closed, and the switch 515 is open; the circuitry is reconfigured that the clock signal 520 at maxima is connected in series with the capacitor 512 and the capacitor 514. The capacitor 514 is being charged by the capacitor 512 (as shown by the dotted arrow) to $2V_{in}$. On the next clock cycle, at time $t_3$, as shown in FIG. 3A, the switch 511 and the switch 515 are closed again, and the switch 513 is open. The capacitor 514 is connected in series with the inversion 521, and the load capacitor 531 is being charged to $3V_{in}$. Namely, the DC-to-DC converter produces a $3V_{in}$ output voltage at the output 530. In this example, with leakage and parasitic capacitance effect ignored, after a complete clock cycle, this 2-stagDC-to-DC converter provides a $3V_{in}$ voltage at the output 530. If additional stages are added into the DC-to-DC converter circuitry, the output voltage is $V_{out}=(N+1)\times V_{in}$, where N is the total number of the stages included in the DC-to-DC converter.

In an embodiment, the switches (e.g., the switches 511, 513 and 515) of the DC-to-DC converter may be micro-electromechanical switches made by integrated circuit fabrication process. The micro-electromechanical switches may be made of silicon, $SiO_2$, $Si_3N_4$, polysilicon, or any other suitable materials. The micro-electromechanical switches may be constructed on a high resistivity silicon substrate with dielectric layer deposited atop to provide electrical isolation. Low resistivity metal or polysilicon may be used for interconnection, electrical contacts or electrodes of the electromechanical switches.

Figure 4:
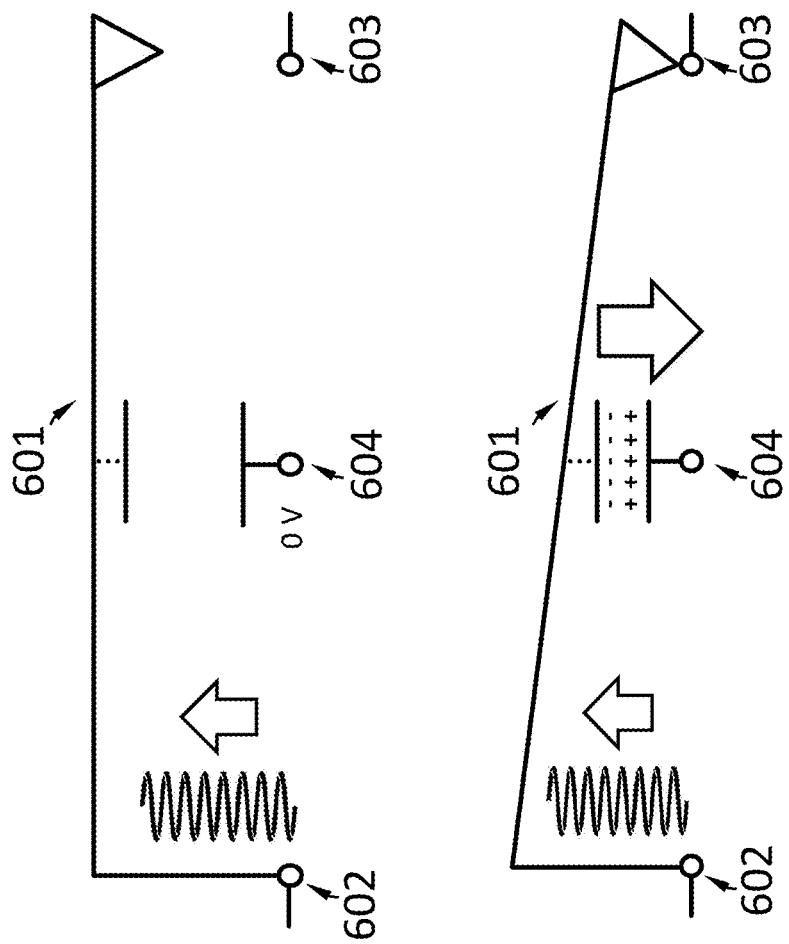
FIG. 4 schematically shows a diagram of a cantilever type micro-electromechanical switch, according to an embodiment.

A cantilever type micro-electromechanical switch is shown schematically in FIG. 4, as an example. In this example, the micro-electromechanical switch consists of a cantilever beam 601, two electrical contacts 602 and 603, a control electrode 604. The cantilever beam 601 is anchored on one end, connected with electrical contact 602, and floats on the other end, above the electrical contact 603, as schematically shown in FIG. 4. When there is no voltage applied on the control electrode 604, the switch is in the open state, where the electrical contact 602 and 603 are not connected (upper diagram of FIG. 4). When a DC voltage is applied to the control electrode 604, an electrostatic force is generated on the cantilever beam 601. When the electrostatic force overcomes the spring force of the cantilever beam on the anchored end, the cantilever beam moves down until the floating end touches the electrical contact 603, thereby closing the micro-electromechanical switch (lower diagram of FIG. 4).

According to an embodiment, the micro-electromechanical switch may stay closed when the voltage on the control electrode 604 remains sufficiently high. When the voltage on the control electrode 604 is removed, the electrostatic force disappears, the cantilever beam moves up under the spring restoring force, thereby opening the micro-electromechanical switch.

The electronics layer 120 may include an electronic system 121 suitable for processing or analyzing signals generated by radiation particles incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs. The electronic system 121 may include components shared by the pixels or components dedicated to a single pixel. For example, the electronic system 121 may include an amplifier dedicated to each pixel and a microprocessor shared among all the pixels.

Figure 5A:
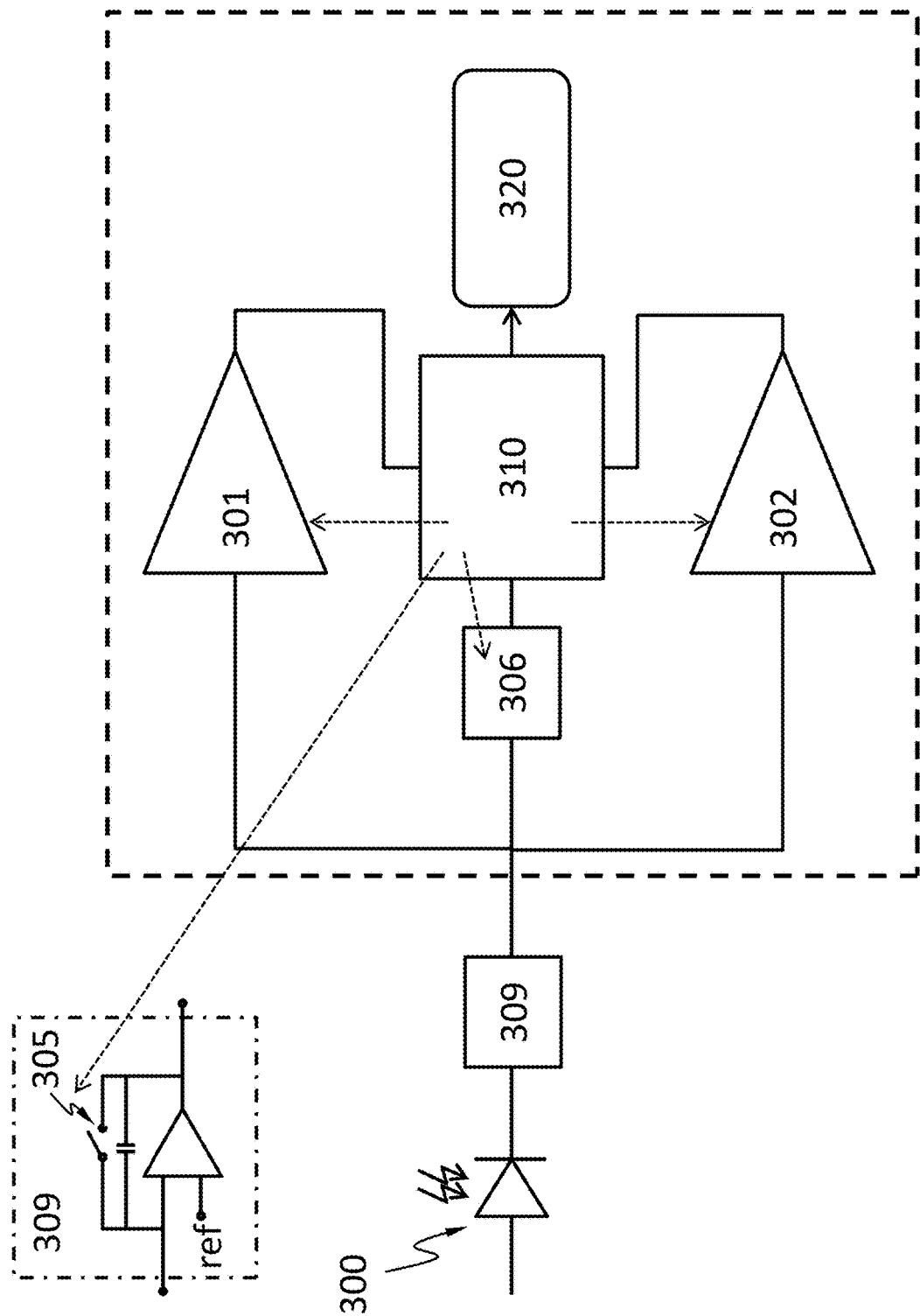
FIG. 5A and FIG. 5B each show a component diagram of an electronic system of the detector in FIG. 2B of FIG. 2C, according to an embodiment.
Figure 5B:
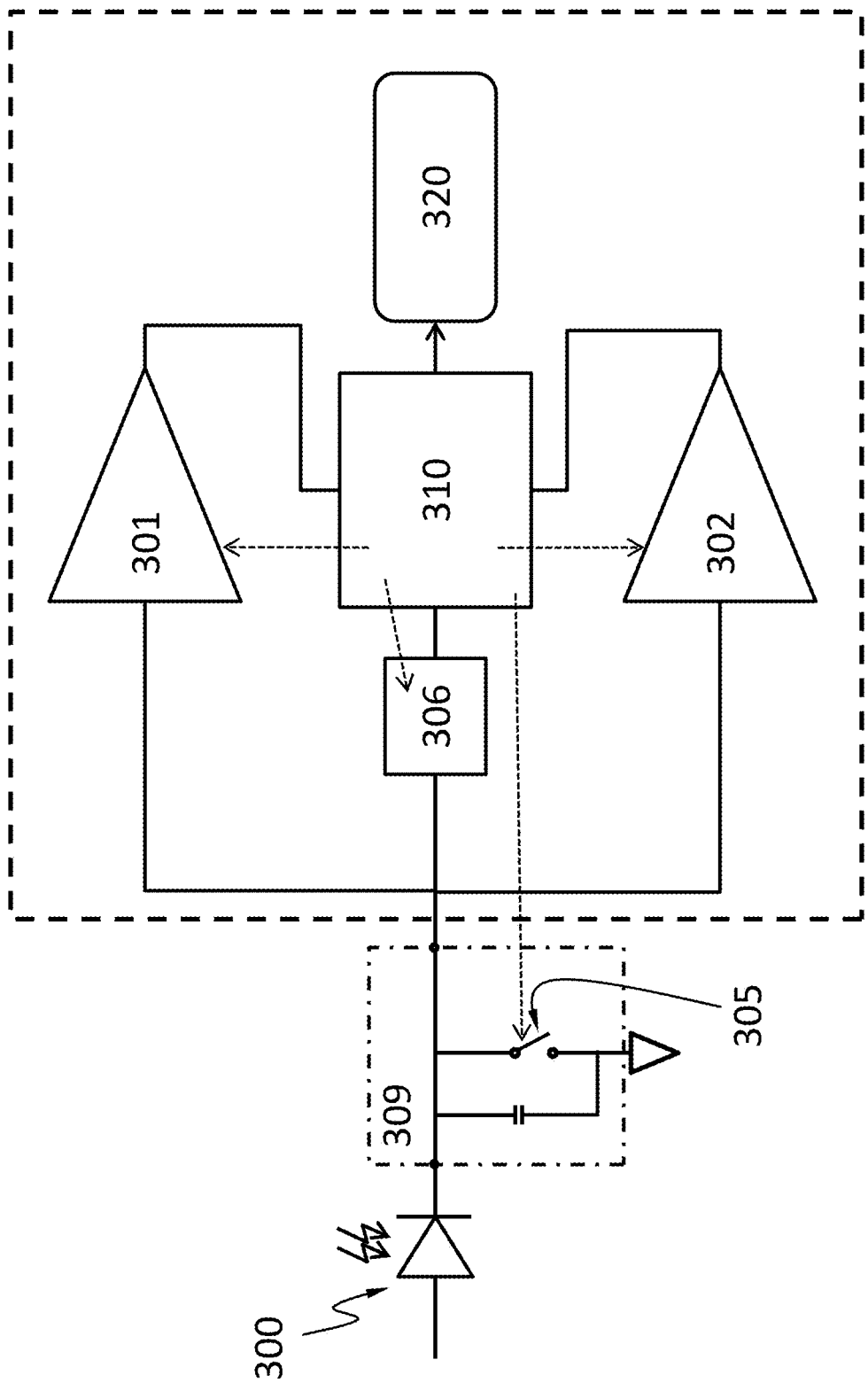

FIG. 5A and FIG. 5B each show a component diagram of the electronic system 121, according to an embodiment. The electronic system 121 may include a first voltage comparator 301, a second voltage comparator 302, a counter 320, a switch 305, a voltmeter 306 and a controller 310.

The first voltage comparator 301 is configured to compare the voltage of an electrode of a diode 300 to a first threshold. The diode may be a diode formed by the first doped region 111, one of the discrete regions 114 of the second doped region 113, and the optional intrinsic region 112. Alternatively, the first voltage comparator 301 is configured to compare the voltage of an electrical contact (e.g., a discrete portion of electrical contact 119B) to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the electronic system 121 misses signals generated by an incident radiation particle. The first voltage comparator 301 configured as a continuous comparator is especially suitable when the incident radiation intensity is relatively high. The first voltage comparator 301 may be a clocked comparator, which has the benefit of lower power consumption. The first voltage comparator 301 configured as a clocked comparator may cause the electronic system 121 to miss signals generated by some incident radiation particles. When the incident radiation intensity is low, the chance of missing an incident radiation particle is low because the time interval between two successive photons is relatively long. Therefore, the first voltage comparator 301 configured as a clocked comparator is especially suitable when the incident radiation intensity is relatively low. The first threshold may be 5-10%, 10%-20%, 20-30%, 30-40% or 40-50% of the maximum voltage one incident radiation particle may generate in the diode or the resistor. The maximum voltage may depend on the energy of the incident radiation particle (i.e., the wavelength of the incident radiation), the material of the radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, \text{ if } x \geq 0 \\ -x, \text{ if } x \leq 0 \end{cases}.$$

The second threshold may be 200%-300% of the first threshold. The second threshold may be at least 50% of the maximum voltage one incident radiation particle may generate in the diode or resistor. For example, the second threshold may be 100 mV, 150 mV, 200 mV, 250 mV or 300 mV. The second voltage comparator 302 and the first voltage comparator 310 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the electronic system 121 to operate under a high flux of incident radiation. However, having a high speed is often at the cost of power consumption.

The counter 320 is configured to register a number of radiation particles reaching the diode or resistor. The counter 320 may be a software component (e.g., a number stored in a computer memory) or a hardware component (e.g., a 4017 IC and a 7490 IC).

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by the counter 320 to increase by one, if, during the time delay, the second voltage comparator 302 determines that the absolute value of the voltage equals or exceeds the absolute value of the second threshold.

The controller 310 may be configured to cause the voltmeter 306 to measure the voltage upon expiration of the time delay. The controller 310 may be configured to connect the electrode to an electrical ground, so as to reset the voltage and discharge any charge carriers accumulated on the electrode. In an embodiment, the electrode is connected to an electrical ground after the expiration of the time delay. In an embodiment, the electrode is connected to an electrical ground for a finite reset time period. The controller 310 may connect the electrode to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The voltmeter 306 may feed the voltage it measures to the controller 310 as an analog or digital signal.

The electronic system 121 may include a capacitor module 309 electrically connected to the electrode of the diode 300 or the electrical contact, wherein the capacitor module is configured to collect charge carriers from the electrode. The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 5, between $t_0$ to $t_1$, or $t_1$-$t_2$). After the integration period has expired, the capacitor voltage is sampled and then reset by a reset switch. The capacitor module can include a capacitor directly connected to the electrode.

Figure 6:
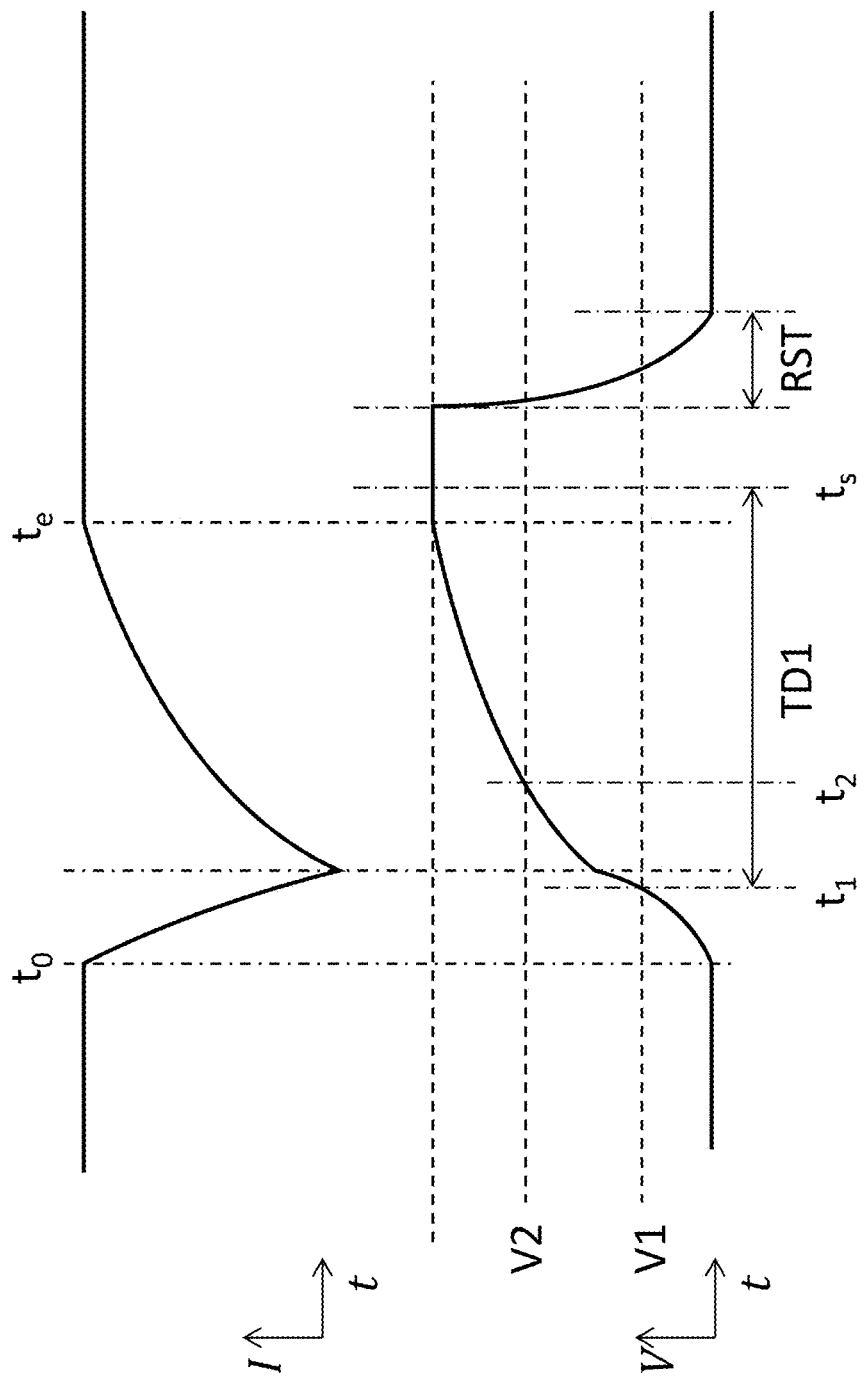
FIG. 6 schematically shows a temporal change of the electric current flowing through an electrode (upper curve) of a diode or an electrical contact of a resistor of a radiation absorption layer exposed to radiation, the electric current caused by charge carriers generated by a radiation photon incident on the radiation absorption layer, and a corresponding temporal change of the voltage of the electrode (lower curve), according to an embodiment.

FIG. 6 schematically shows a temporal change of the electric current flowing through the electrode (upper curve) caused by charge carriers generated by a radiation particle incident on the diode or the resistor, and a corresponding temporal change of the voltage of the electrode (lower curve). The voltage may be an integral of the electric current with respect to time. At time $t_0$, the radiation particle hits the diode or the resistor, charge carriers start being generated in the diode or the resistor, electric current starts to flow through the electrode of the diode or the resistor, and the absolute value of the voltage of the electrode or electrical contact starts to increase. At time $t_1$, the first voltage comparator 301 determines that the absolute value of the voltage equals or exceeds the absolute value of the first threshold V1, and the controller 310 starts the time delay TD1 and the controller 310 may deactivate the first voltage comparator 301 at the beginning of TD1. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold at time $t_2$, the controller 310 causes the number registered by the counter 320 to increase by one. At time $t_e$, all charge carriers generated by the radiation particle drift out of the radiation absorption layer 110. At time $t_s$, the time delay TD1 expires. In the example of FIG. 5, time $t_s$ is after time $t_e$; namely TD1 expires after all charge carriers generated by the radiation particle drift out of the radiation absorption layer 110. The rate of change of the voltage is thus substantially zero at $t_s$. The controller 310 may be configured to deactivate the second voltage comparator 302 at expiration of TD1 or at $t_2$, or any time in between.

The controller 310 may be configured to cause the voltmeter 306 to measure the voltage upon expiration of the time delay TD1. In an embodiment, the controller 310 causes the voltmeter 306 to measure the voltage after the rate of change of the voltage becomes substantially zero after the expiration of the time delay TD1. The voltage at this moment is proportional to the amount of charge carriers generated by a radiation particle, which relates to the energy of the radiation particle. The controller 310 may be configured to determine the energy of the radiation particle based on voltage the voltmeter 306 measures. One way to determine the energy is by binning the voltage. The counter 320 may have a sub-counter for each bin. When the controller 310 determines that the energy of the radiation particle falls in a bin, the controller 310 may cause the number registered in the sub-counter for that bin to increase by one. Therefore, the electronic system 121 may be able to detect a radiation image and may be able to resolve radiation particle energies of each radiation particle.

After TD1 expires, the controller 310 connects the electrode to an electric ground for a reset period RST to allow charge carriers accumulated on the electrode to flow to the ground and reset the voltage. After RST, the electronic system 121 is ready to detect another incident radiation particle. Implicitly, the rate of incident radiation particles the electronic system 121 can handle in the example of FIG. 6 is limited by 1/(TD1+RST). If the first voltage comparator 301 has been deactivated, the controller 310 can activate it at any time before RST expires. If the controller 310 has been deactivated, it may be activated before RST expires.

Figure 7:
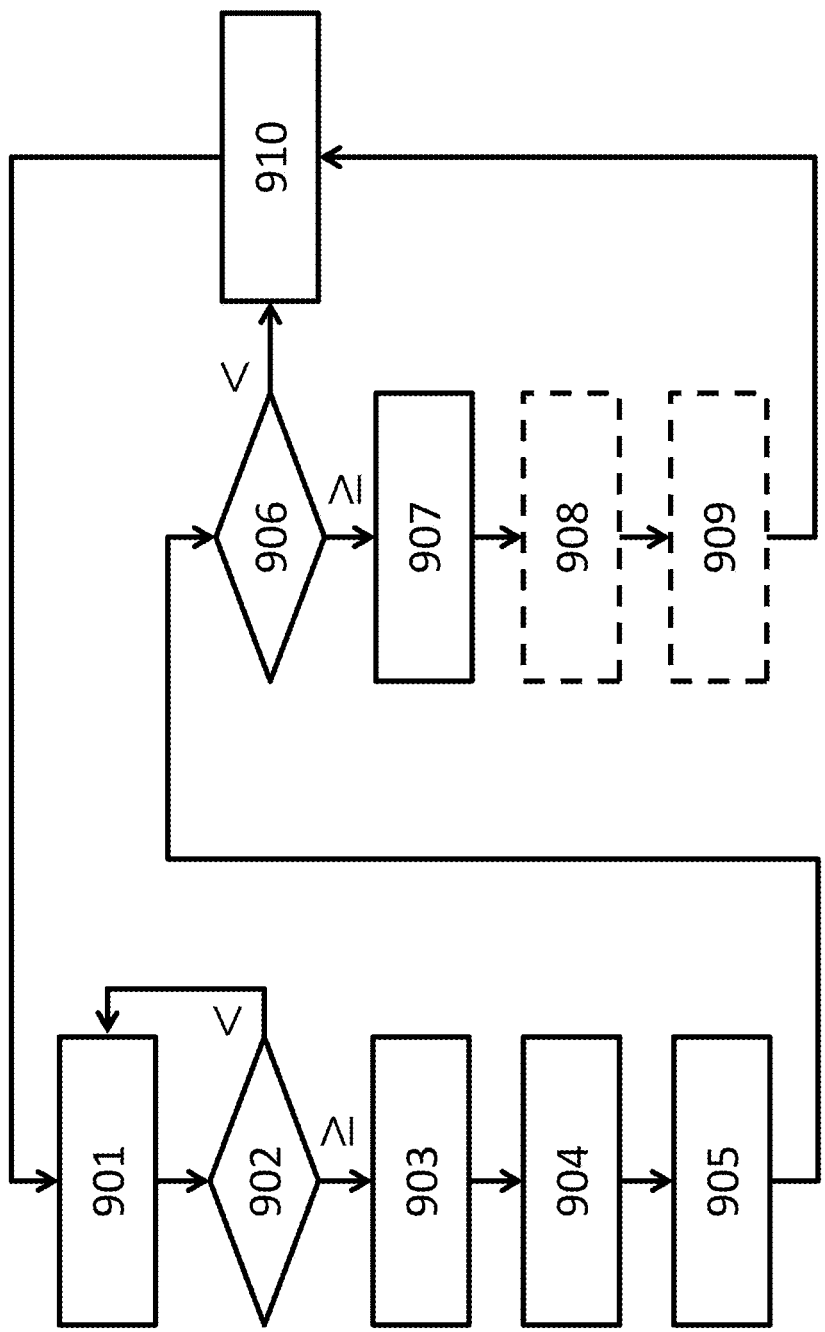
FIG. 7 shows a flow chart for a method suitable for detecting radiation using a system such as the electronic system operating as shown in FIG. 5A or FIG. 5B, according to an embodiment.

FIG. 7 shows a flow chart for a method suitable for detecting radiation using a system such as the electronic system 121 operating as shown in FIG. 5A and FIG. 5B. In step 901, compare, e.g., using the first voltage comparator 301, a voltage of an electrode of a diode or an electrical contact of a resistor exposed to radiation, to the first threshold. In step 902, determine, e.g., with the controller 310, whether the absolute value of the voltage equals or exceeds the absolute value of the first threshold V1. If the absolute value of the voltage does not equal or exceed the absolute value of the first threshold, the method goes back to step 901. If the absolute value of the voltage equals or exceeds the absolute value of the first threshold, continue to step 903. In step 903, start, e.g., using the controller 310, the time delay TD1. In step 904, activate, e.g., using the controller 310, a circuit (e.g., the second voltage comparator 302 or the counter 320) during the time delay TD1 (e.g., at the expiration of TD1). In step 905, compare, e.g., using the second voltage comparator 302, the voltage to the second threshold. In step 906, determine, e.g., using the controller 310, whether the absolute value of the voltage equals or exceeds the absolute value of the second threshold V2. If the absolute value of the voltage does not equal or exceed the absolute value of the second threshold, the method goes to step 910. If the absolute value of the voltage equals or exceeds the absolute value of the second threshold, continue to step 907. In step 907, cause, e.g., using the controller 310, the number registered in the counter 320 to increase by one. In optional step 908, measure, e.g., using the voltmeter 306, the voltage upon expiration of the time delay TD1. In optional step 909, determine, e.g., using the controller 310, the radiation particle energy based the voltage measured in step 908. There may be a counter for each of the energy bins. After measuring the radiation particle energy, the counter for the bin to which the photon energy belongs can be increased by one. The method goes to step 910 after step 909. In step 910, reset the voltage to an electrical ground, e.g., by connecting the electrode of the diode or an electrical contact of a resistor to an electrical ground. Steps 908 and 909 may be omitted, for example, when neighboring pixels share a large portion (e.g., >30%) of charge carriers generated from a single photon.

Figure 8:
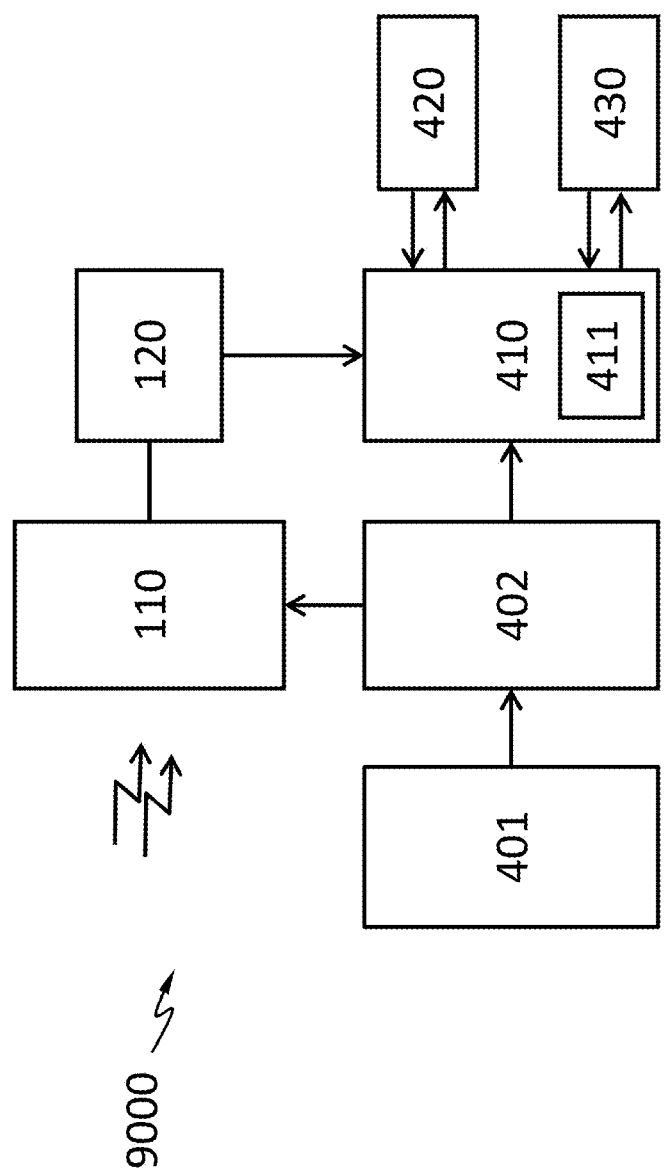
FIG. 8 schematically shows a block diagram of a system comprising a radiation detector and peripheral function units, according to an embodiment.

FIG. 8 schematically shows a block diagram of a system 9000 comprising the radiation detector 100 described herein and peripheral function units, according to an embodiment. The system 9000 comprises the radiation absorption layer 110 and the electronics layer 120 of the radiation detector 100.

The system 9000 may comprise a power supply 401 configured to provide electric power to the radiation detection system 9000. The power supply 401 may receive electric power from outside the system 9000, or the power supply 401 may comprise a battery to supply power to the system 9000. The system 9000 may also comprise a power management unit 402 configured to supply different internal voltages to the radiation detector 100 and other peripheral function units. The power management unit 402 comprises the DC-to-DC converter. The DC-to-DC converter is configured to receive an input DC supply from power supply 401, for example, from the battery, and convert to a DC bias voltage (e.g., >50 V, or >100 V) as output, to establish the external electric field in the radiation absorption layer 110. The power management unit 402 may comprise LDO regulators to supply voltages to the other peripheral function units of the system 9000.

The system 9000 may comprise a communication unit 410 configured to communicate with inside and outside circuitries. For example, the electronic system 121 may transmit radiation count information to an outside circuitry through the communication unit 410. The communication unit 410 may communicate with outside circuitry through a wired connection. The communication unit 410 may comprise a wireless communication processor 411 and communicate with outside circuitry using the wireless communication processor 411. The wireless communication processor 411 may support various wireless communication protocols, such as Bluetooth, Wi-Fi, Z-wave or ZigBee.

The system 9000 may comprise a GPS receiver 420 configured to record a location of radiation detected by the radiation detector 100. Compiling the location information from GPS receiver 420 and radiation count information from the electronic system 121, the system 9000 may generate a map with radiation distribution.

The system 9000 may comprise a display 430 configured to show information of radiation detected by the radiation detector 100. For example, the real-time radiation counts may be shown in the display 430. The display 430 may be used to show recorded radiation counts combined with GPS locations.

Figure 9:
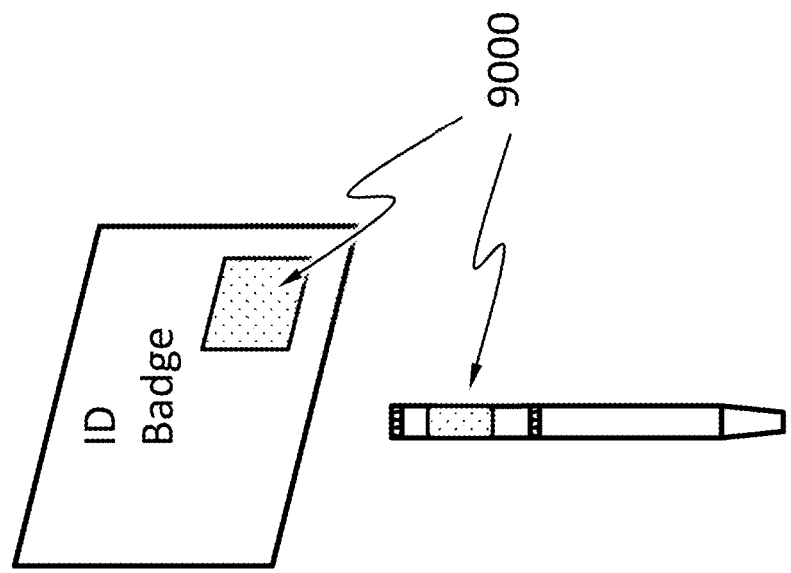
FIG. 9 schematically shows an example of an ID card, or an access badge or a radiation detector pen comprising a radiation detection system described herein, according to an embodiment.
Figure 9:
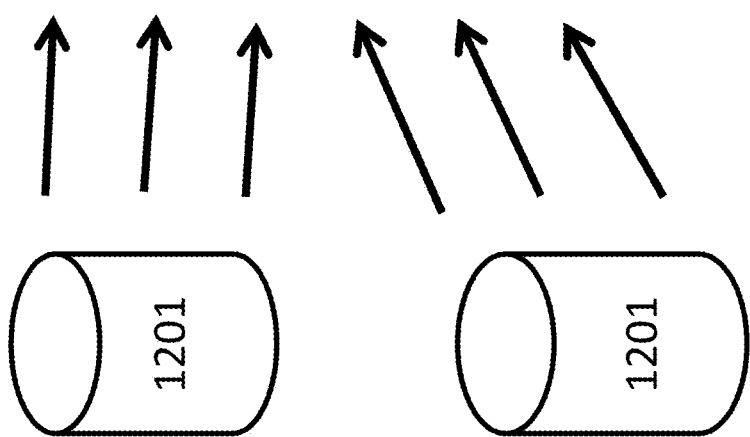

FIG. 9 schematically shows that the radiation detection system 9000 may be attached to an employee ID, or an access badge or may be a radiation detector pen. The system may be used in medical office, workshop, labs, or other working environment that might have potential risk of personnel radiation exposure. For example, the system 9000 may be embedded in the ID card or the badge card, or may be clipped or attached onto the ID card or the badge card. Radiation emitted from radiation sources 1201 can be detected by the radiation detection system 9000, the energy intensity and spectrum information can be displayed in the system or transmitted to anther data analysis device. By checking the radiation data recorded by the radiation detection system 9000, the radiation exposure risk can be therefore estimated.

Figure 10:
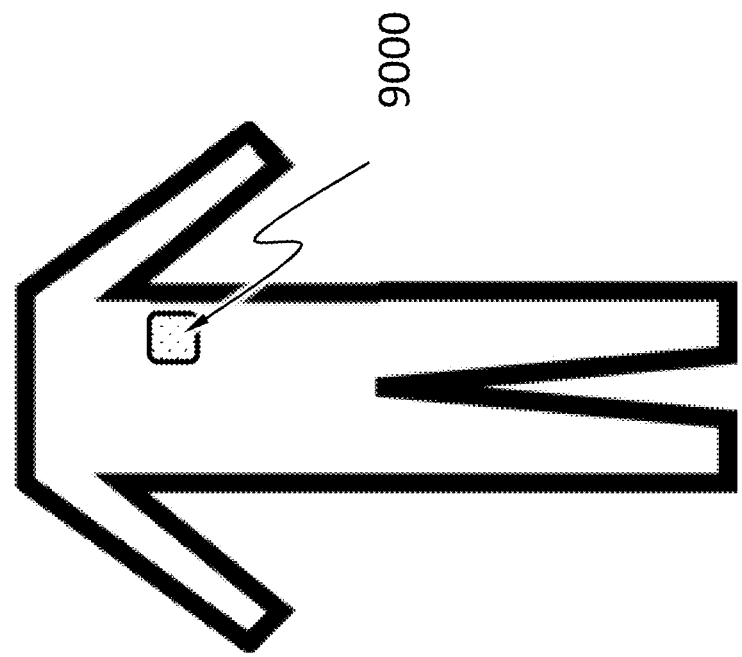
FIG. 10 schematically shows a piece of apparel comprising a radiation detection system described herein, according to an embodiment.

FIG. 10 schematically shows that the radiation detection system 9000 may be a piece of apparel. The system 9000 may be used for preventing and monitoring radiation in the office, workshop. The system 9000 may be configured to clip or attach onto the apparel or working suit, at one spot or multiple spots. Radiation emitted from the radiation source 1301 may be recorded in the radiation detection system 9000, and may be transmitted to another receiving device to display. The radiation detection system 9000 may provide radiation information, like the type of radiation and the intensity of radiation, by detecting the intensity distribution of the radiation and/or energies of the radiation particles. By combining the location information provided by the system 9000, the potential radiation leakage locations may be analyzed.

Figure 11:
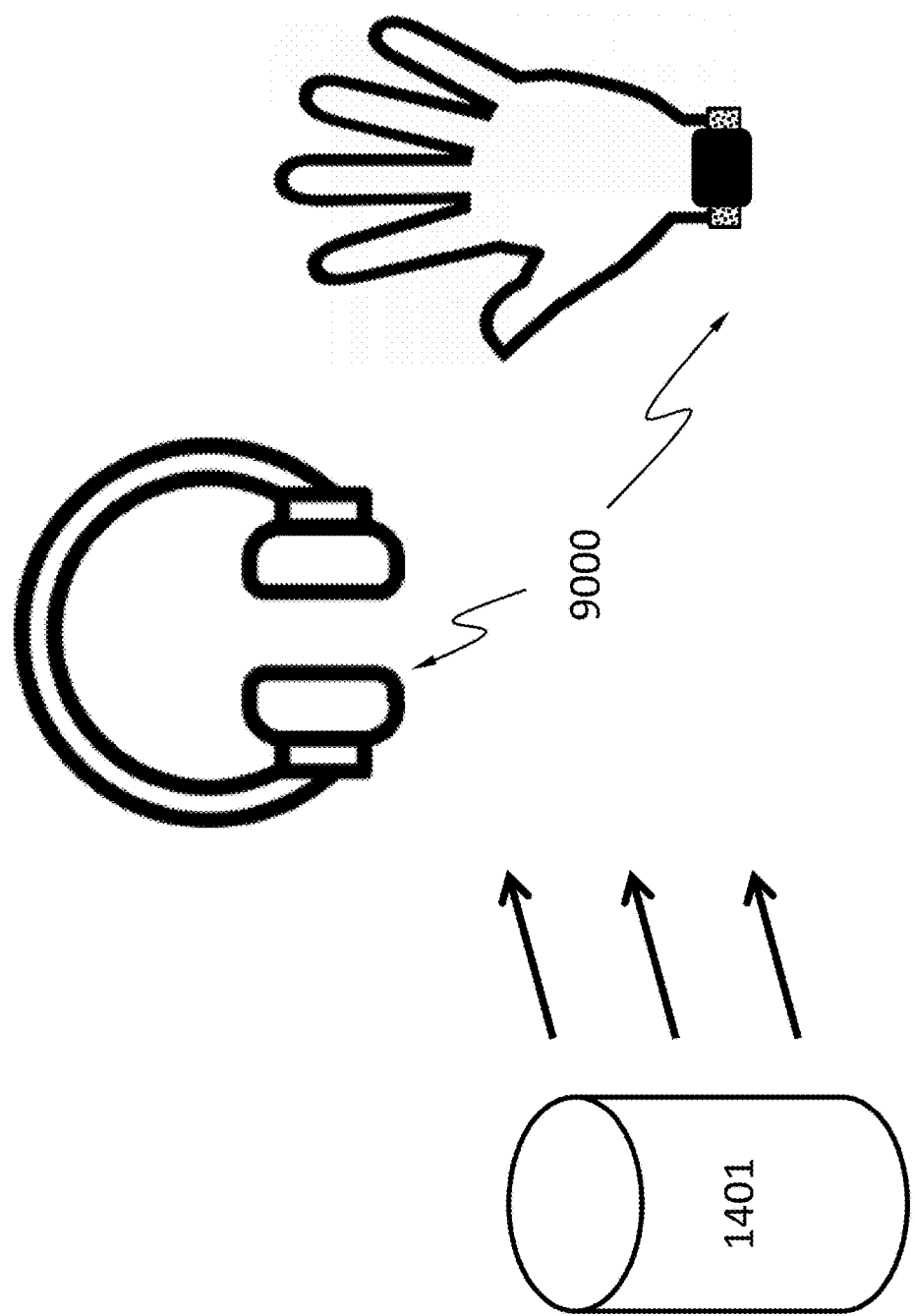
FIG. 11 schematically shows a wristband or a watch comprising a radiation detection system described herein, according to an embodiment.

FIG. 11 schematically shows examples of wearable electronic systems comprising the radiation detection system 9000 described herein. A wearable electronic system may have the radiation detection system 9000 built-in and may be a sport wristband, an electronic watch, or a headphone. Radiation emitted from the radiation source 1401 may be incident on the radiation detector 100 built in the electronic watch, or in the headphone. The radiation detection system 9000 may be configured to provide radiation information, like the type of radiation and the intensity of radiation, by detecting the intensity distribution of the radiation and/or energies of the radiation particles. For example, the portable device may give the bearer a warning message if it detects a nearby radiation level exceeds a preset value. The system 9000 may record the location of the radiation level in the map.

Figure 12:
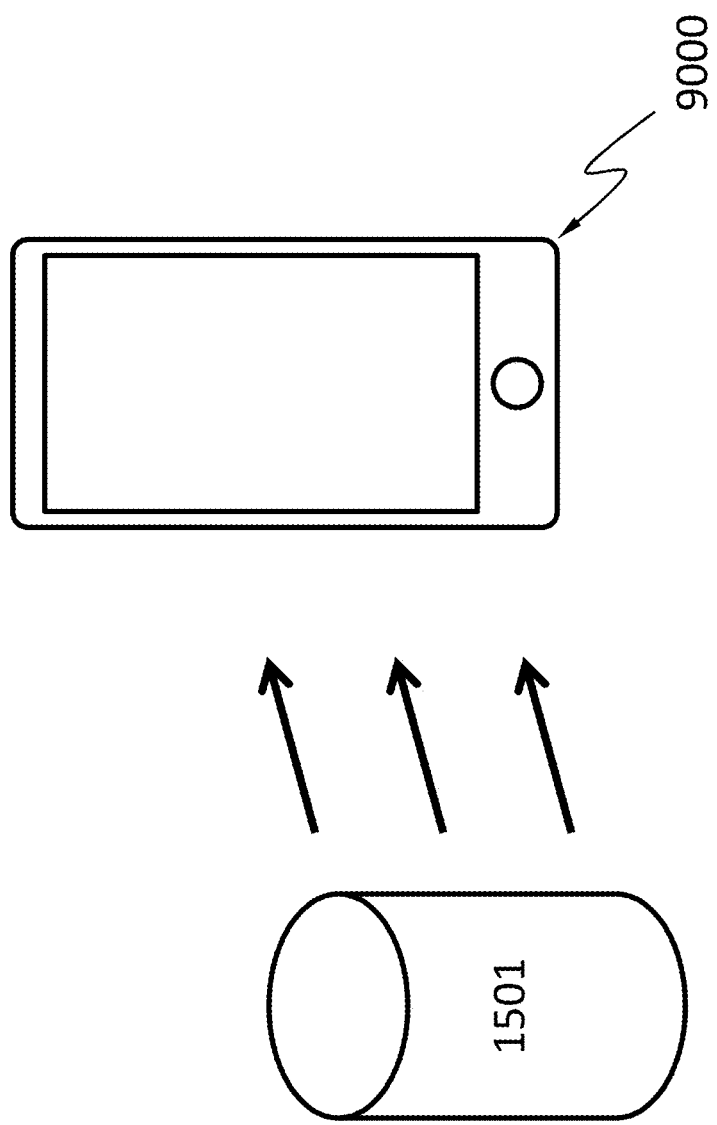
FIG. 12 schematically shows a cell phone comprising a radiation detection system described herein, according to an embodiment.

FIG. 12 schematically shows a cell phone comprising the radiation detection system 9000 described herein. The radiation detection system 9000 may be a built-in unit, or an externally connected peripheral of the cell phone. Radiation emitted from the radiation source 1501 may be incident onto the radiation detector 100 embedded in the cell phone, or attached on the cell phone. The radiation detection system 9000 may be configured to provide radiation information, like the type of radiation and the intensity of radiation, by detecting the intensity distribution of the radiation and/or energies of the radiation particles, and to display the radiation information or warning message on the cell phone through related cell phone applications.

Figure 13:
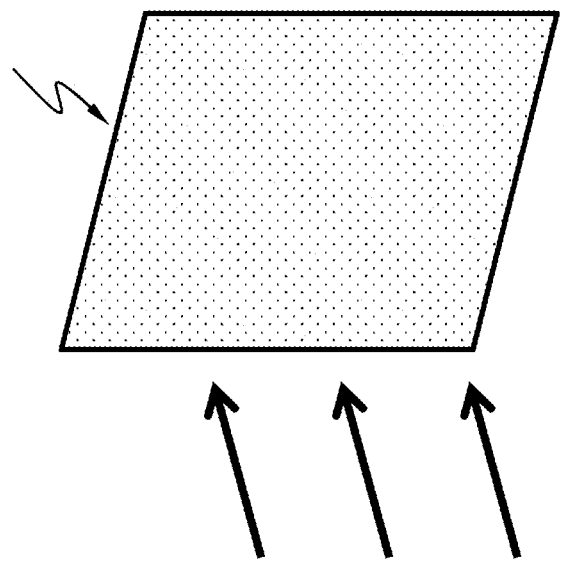
FIG. 13 schematically shows a food radiation detection apparatus comprising a radiation detection system described herein, according to an embodiment.
Figure 13:
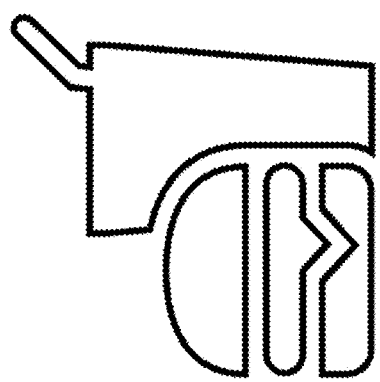

FIG. 13 schematically shows a food radiation detection system comprising the radiation detection system 9000 described herein. Radiation emitted from food inspected may be detected by the radiation detection system 9000. The radiation detection system 9000 may be configured to provide radiation information, such as the intensity of radiation residue existing in the food and the type of radiation residue in the display or to transmit to a receiving device, by detecting and analyzing the intensity distribution of the radiation and/or energies of the radiation particles.

FIG. 14 schematically shows an example of a household smoke detector comprising the radiation detection system 9000 described herein. The radiation detection system 9000 may be a part of a smoke detector, monitoring and collecting the radiation level of the household. The radiation detection system 9000 may be configured to send out alarm if a preset radiation level is exceeded. The radiation detection system 9000 may be configured to collect and record the radiation level over a time period.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus suitable for detecting radiation, comprising:
    a radiation absorption layer comprising a semiconductor, a first electrical contact and a second electrical contact, the first electrical contact positioned across the semiconductor from the second electrical contact;
    a DC-to-DC converter configured to apply a DC voltage between the first electrical contact and the second electrical contact, the DC-to-DC converter comprising micro-electromechanical switches;
    wherein the DC-to-DC converter is configured to receive a clock signal and to control the micro-electromechanical switches with the clock signal and an inversion thereof.

2. The apparatus of claim 1, wherein the DC-to-DC converter comprises multiple stages, wherein each of the stages comprises a capacitor and at least one of the micro-electromechanical switches.

3. The apparatus of claim 1, wherein each of the micro-electromechanical switches comprises a cantilever beam, electrical contacts and a control electrode.

4. The apparatus of claim 3, wherein the micro-electromechanical switches are configured to open or close by changing a voltage on the control electrode.

5. The apparatus of claim 1, wherein the micro-electromechanical switches comprise silicon, $SiO_2$, $Si_3N_4$, polysilicon, or a combination thereof.

6. The apparatus of claim 1, wherein the first electrical contact and the second electrical contact are configured to collect charge carriers generated by radiation particles absorbed by the radiation absorption layer.

7. The apparatus of claim 1, further comprising:
    a first voltage comparator configured to compare a voltage of the second electrical contact to a first threshold;
    a second voltage comparator configured to compare the voltage to a second threshold;
    a counter configured to register a number of radiation particles absorbed by the radiation absorption layer;
    a controller;
    wherein the controller is configured to start a time delay from a time at which the first voltage comparator determines that an absolute value of the voltage equals or exceeds an absolute value of the first threshold;
    wherein the controller is configured to activate the second voltage comparator during the time delay;
    wherein the controller is configured to cause the number registered by the counter to increase by one, if the second voltage comparator determines that an absolute value of the voltage equals or exceeds an absolute value of the second threshold.

8. The apparatus of claim 7, wherein the controller is configured to activate the second voltage comparator at a beginning or expiration of the time delay.

9. The apparatus of claim 7, further comprising a voltmeter, wherein the controller is configured to cause the voltmeter to measure the voltage upon expiration of the time delay.

10. The apparatus of claim 7, wherein the controller is configured to determine radiation particle energy based on a value of the voltage measured upon expiration of the time delay.

11. The apparatus of claim 7, wherein the controller is configured to connect the second electrical contact to an electric ground.

12. The apparatus of claim 7, wherein a rate of change of the voltage is substantially zero at expiration of the time delay.

13. The apparatus of claim 7, wherein a rate of change of the voltage is substantially non-zero at expiration of the time delay.

14. The apparatus of claim 1, further comprising a capacitor module electrically connected to the second electrical contact, wherein the capacitor module is configured to collect charge carriers from the second electrical contact.

15. The apparatus of claim 1, wherein the radiation absorption layer comprises a diode.

16. The apparatus of claim 1, wherein the radiation absorption layer comprises silicon, germanium, GaAs, CdTe, CdZnTe, or a combination thereof.

17. The apparatus of claim 1, wherein the apparatus does not comprise a scintillator.

18. The apparatus of claim 1, further comprises a GPS receiver configured to record a location of radiation detected by the apparatus.

19. The apparatus of claim 1, further comprises a display configured to show information of radiation detected by the apparatus.

20. The apparatus of claim 1, further comprises a wireless transmitter configured to transmit information of radiation detected by the apparatus to a receiving device.

21. A system comprising the apparatus of claim 1, wherein the system is selected from a group consisting of a radiation detection ID card, a radiation detection badge, a radiation detection pen, a piece of radiation prevention apparel, a radiation detection wristband, a radiation detection watch, a radiation detection headphone, a radiation detection cell phone accessory, and a food radiation detection apparatus, and a household radiation detector.

* * * * *